UNITED STATES PATENT OFFICE.

CARL KRAH, OF KREISCHERVILLE, NEW YORK.

COMPOSITION OF MATTER FOR BINDING COAL-DUST.

SPECIFICATION forming part of Letters Patent No. 531,953, dated January 1, 1895.

Application filed October 25, 1894. Serial No. 526,978. (No specimens.)

*To all whom it may concern:*

Be it known that I, CARL KRAH, a citizen of the German Empire, residing at Kreischerville, in the county of Richmond and State of New York, have invented new and useful Improvements in a Composition of Matter for Binding Coal-Dust, of which the following is a specification.

My composition is to be used as a binding or adhesive for coal dust. The coal dust can thereby be formed or pressed into forms or briquettes and utilized as fuel. The composition is serviceable in effectively and rapidly binding the dust of hard or of soft coal.

My composition consists of the following ingredients combined in substantially the proportions stated, twenty (20) parts by weight of glue, fifty-five (55) parts by weight of water, five (5) parts by weight of shellac dissolved in alcohol, ten (10) parts by weight of glycerine, four (4) parts by weight of chalk, six (6) parts by weight of sulphur.

The glue is boiled in the water and when the glue is dissolved the remaining ingredients are added, and the whole thoroughly mingled by agitation, after which the composition can be poured into molds or forms where it forms a solid mass which can be shipped or handled in commerce.

In the manufacture of briquettes the above composition is boiled in about fifty (50) per cent. of water to be redissolved, and this solution while hot is used for sprinkling or wetting the coal dust which latter is then at once to be pressed. As the wetting requires but little binding material, a comparatively cheap means is obtained answering all requirements for forming the practically valueless or waste coal dust into a serviceable and clean fuel. These briquettes retain their form in the furnace until burned to ash, and possess the advantage of being slowly consumed.

This composition of matter has the advantage not only of readily becoming hard, and of firmly binding the coal dust when pressed, but said composition also aids the combustion and the formation of heating gases.

In making the solution of shellac in alcohol only so much alcohol is required as suffices to dissolve the shellac, so that the dissolved shellac can be readily mixed with the other substances.

The chalk used is preferably precipitated chalk as this latter is readily soluble in water.

What I claim as new, and desire to secure by Letters Patent, is—

The herein described composition of matter to be used for binding coal dust, consisting of glue, water, shellac, glycerine, chalk and sulphur substantially in the proportions specified.

In testimony whereof I have hereunto set my hand in the presence of two subscribing witnesses.

CARL KRAH.

Witnesses:
 WM. C. HAUFF,
 E. F. KASTENHUBER.